(12) United States Patent
Mattsson et al.

(10) Patent No.: US 9,430,767 B2
(45) Date of Patent: Aug. 30, 2016

(54) TOKENIZATION IN MOBILE ENVIRONMENTS

(71) Applicant: Protegrity Corporation, Grand Cayman (KY)

(72) Inventors: Ulf Mattsson, Cos Cob, CT (US); Yigal Rozenberg, Wilton, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

(21) Appl. No.: 14/929,676

(22) Filed: Nov. 2, 2015

(65) Prior Publication Data

US 2016/0055482 A1 Feb. 25, 2016

Related U.S. Application Data

(63) Continuation of application No. 14/516,489, filed on Oct. 16, 2014, which is a continuation of application No. 13/761,011, filed on Feb. 6, 2013, now Pat. No. 8,893,250.

(60) Provisional application No. 61/597,588, filed on Feb. 10, 2012, provisional application No. 61/597,592, filed on Feb. 10, 2012, provisional application No. 61/609,677, filed on Mar. 12, 2012.

(51) Int. Cl.
*H04L 29/06* (2006.01)
*G06Q 20/36* (2012.01)
(Continued)

(52) U.S. Cl.
CPC ........... *G06Q 20/367* (2013.01); *G06F 21/606* (2013.01); *G06Q 20/20* (2013.01); *G06Q 20/32* (2013.01); *G06Q 20/322* (2013.01); *G06Q 20/382* (2013.01); *G06Q 20/385* (2013.01); *G06Q 20/3821* (2013.01); *G06Q 20/3829* (2013.01); *G06Q 20/405* (2013.01); *G06Q 2220/00* (2013.01)

(58) Field of Classification Search
CPC . G06Q 20/367; G06Q 20/32; G06Q 20/3829
See application file for complete search history.

(56) References Cited

U.S. PATENT DOCUMENTS 5,016,277 A 5/1991 Hamilton
5,899,981 A 5/1999 Taylor et al.
(Continued)

OTHER PUBLICATIONS

Mattsson, U.T., "Format-Controlling Encryption Using Datatype-Preserving Encryption," National Institute of Standards and Technology, Dec. 5, 2012, pp. 1-46, can be retrieved at <http://csrc.nist.gov/groups/ST/toolkit/BCM/documents/proposedmodes/fc-em/fcem-spec.pdf>.

(Continued)

*Primary Examiner* — Chau Le
(74) *Attorney, Agent, or Firm* — Fenwick & West LLP

(57) ABSTRACT

Data can be protected in mobile and payment environments through various tokenization operations. A mobile device can tokenize communication data based on device information and session information associated with the mobile device. A payment terminal can tokenize payment information received at the payment terminal during a transaction based on transaction information associated with the transaction. Payment data tokenized first a first set of token tables and according to a first set of tokenization parameters by a first payment entity can be detokenized or re-tokenized with a second set of token tables and according to a second set of tokenization parameters. Payment information can be tokenized and sent to a mobile device as a token card based on one or more selected use rules, and a user can request a transaction based on the token card. The transaction can be authorized if the transaction satisfies the selected use rules.

20 Claims, 8 Drawing Sheets

(51) Int. Cl.
*G06Q 20/38* (2012.01)
*G06Q 20/40* (2012.01)
*G06F 21/60* (2013.01)
*G06Q 20/20* (2012.01)
*G06Q 20/32* (2012.01)

(56) References Cited

U.S. PATENT DOCUMENTS

| | | | |
|---|---|---|---|
| 6,230,201 B1 | 5/2001 | Guck et al. | |
| 6,360,254 B1 | 3/2002 | Linden et al. | |
| 7,120,933 B2 | 10/2006 | Mattsson | |
| 7,222,079 B1 | 5/2007 | Seare et al. | |
| 7,305,707 B2 | 12/2007 | Mattsson | |
| 8,489,872 B1 | 7/2013 | Kapoor | |
| 8,812,482 B1 | 8/2014 | Kapoor et al. | |
| 2003/0014315 A1* | 1/2003 | Jaalinoja | G06Q 20/045 705/18 |
| 2003/0028481 A1 | 2/2003 | Flitcroft et al. | |
| 2003/0061170 A1* | 3/2003 | Uzo | G06Q 20/06 705/64 |
| 2003/0064807 A1 | 4/2003 | Walker et al. | |
| 2003/0130921 A1 | 7/2003 | Force et al. | |
| 2003/0158850 A1 | 8/2003 | Lawrence et al. | |
| 2004/0019571 A1* | 1/2004 | Hurwitz | G06Q 20/06 705/65 |
| 2004/0030659 A1 | 2/2004 | Gueh | |
| 2004/0073621 A1* | 4/2004 | Sampson | G06F 17/30067 709/209 |
| 2004/0073688 A1 | 4/2004 | Sampson | |
| 2004/0098313 A1 | 5/2004 | Agrawal et al. | |
| 2005/0079866 A1* | 4/2005 | Chen | H04L 63/0807 455/435.1 |
| 2006/0039030 A1 | 2/2006 | Peterschmidt | |
| 2006/0075253 A1 | 4/2006 | Sonkin et al. | |
| 2006/0190380 A1 | 8/2006 | Force et al. | |
| 2006/0235803 A1 | 10/2006 | Romney | |
| 2006/0277108 A1 | 12/2006 | Altberg et al. | |
| 2007/0113170 A1 | 5/2007 | Dignum et al. | |
| 2007/0113171 A1 | 5/2007 | Behrens et al. | |
| 2007/0125840 A1* | 6/2007 | Law | G06Q 20/10 235/379 |
| 2007/0192619 A1 | 8/2007 | Gifford et al. | |
| 2007/0265807 A1 | 11/2007 | Schimpf et al. | |
| 2008/0077532 A1* | 3/2008 | Von Heesen | G06Q 20/02 705/67 |
| 2008/0082834 A1 | 4/2008 | Mattsson | |
| 2009/0077554 A1 | 3/2009 | Reed et al. | |
| 2009/0172402 A1 | 7/2009 | Tran | |
| 2009/0228368 A1 | 9/2009 | Brown | |
| 2009/0249082 A1 | 10/2009 | Mattsson | |
| 2010/0070867 A1 | 3/2010 | Lemmers | |
| 2010/0091995 A1* | 4/2010 | Chen | H04L 63/0492 380/278 |
| 2010/0191652 A1 | 7/2010 | Eckert et al. | |
| 2010/0205053 A1 | 8/2010 | Shuster | |
| 2010/0257612 A1 | 10/2010 | McGuire | |
| 2011/0060719 A1 | 3/2011 | Kapoor | |
| 2011/0099104 A1* | 4/2011 | Nybom | G06Q 20/06 705/41 |
| 2011/0113245 A1 | 5/2011 | Varadarajan | |
| 2011/0154466 A1 | 6/2011 | Harper et al. | |
| 2011/0211689 A1 | 9/2011 | Von Mueller et al. | |
| 2011/0213807 A1* | 9/2011 | Mattsson | G06F 21/6245 707/802 |
| 2011/0290875 A1 | 12/2011 | Wengrovitz | |
| 2012/0016731 A1* | 1/2012 | Smith | G06Q 20/20 705/14.33 |
| 2012/0030047 A1* | 2/2012 | Fuentes | G06Q 20/04 705/26.1 |
| 2012/0036042 A1 | 2/2012 | Graylin et al. | |
| 2012/0114119 A1 | 5/2012 | Ahuja et al. | |
| 2012/0290415 A1 | 11/2012 | Ltwaru | |
| 2012/0316992 A1 | 12/2012 | Oborne | |
| 2013/0091162 A1 | 4/2013 | Lewak | |
| 2013/0095754 A1 | 4/2013 | Moreton et al. | |
| 2013/0103685 A1 | 4/2013 | Preneel et al. | |
| 2013/0117185 A1 | 5/2013 | Collison et al. | |
| 2013/0212666 A1* | 8/2013 | Mattsson | G06Q 20/405 726/9 |

OTHER PUBLICATIONS

McCallister, E., et al., "Guide to Protecting the Confidentiality of Personally Identifiable Information (PII)", National Institute of Standards and Technology, U.S.Department of Commerce, Jan. 2009, pp. 2-58, can be retrieved at <http://csrc.nist.gov/puplications/PubsSPs.html>.

Patent Cooperation Treaty, International Search Report and Written Opinion, International Patent Application No. PCT/US2013/025289, Jun. 14, 2013, 14 Pages.

United States Office Action, U.S. Appl. No. 13/761,011, Aug. 13, 2014, 7 pages.

United States Office Action, U.S. Appl. No. 13/761,011, May 7, 2014, 12 pages.

European Extended Search Report, European Application No. 13747085.2, Jun. 26, 2015, 7 pages.

Australian First Examination Report, Australian Application No. 2013216868, Jun. 5, 2015, 2 pages.

United States Office Action, U.S. Appl. No. 13/761,009, Jun. 26, 2015, 33 pages.

United States Office Action, U.S. Appl. No. 13/761,009, Feb. 26, 2015, 22 pages.

United States Office Action, U.S. Appl. No. 13/761,028, Mar. 19, 2015, 16 pages.

United States Office Action, U.S. Appl. No. 13/761,028, Feb. 26, 2016, 8 pages.

United States Office Action, U.S. Appl. No. 13/761,020, Mar. 1, 2016, 24 pages.

United States Office Action, U.S. Appl. No. 14/516,489, Mar. 16, 2016, 14 pages.

* cited by examiner

TOKENIZATION IN MOBILE ENVIRONMENTS

CROSS REFERENCE TO RELATED APPLICATIONS

This application is a continuation of U.S. application Ser. No. 14/516,489, filed Oct. 16, 2014, which application is a continuation of U.S. application Ser. No. 13/761,011, filed Feb. 6, 2013, now U.S. Pat. No. 8,893,250, which claims the benefit of Provisional Applications No. 61/597,588, filed on Feb. 10, 2012, No. 61/597,592, filed on Feb. 10, 2012, and No. 61/609,677, filed on Mar. 12, 2012, all of which is incorporated herein by reference in their entirety.

FIELD OF ART

This application relates generally to the field of data protection, and more specifically to the tokenization of data in mobile and payment environments.

BACKGROUND

Many challenges exist in handling financial and other sensitive data, such as credit card numbers, social security numbers, bank account numbers, and the like. In use, a mobile system for processing such sensitive data transmits the sensitive data, often wirelessly, between multiple authorized entities, any of which can store the sensitive data. For example, in a retail environment a user may make a payment with a mobile phone at a register, the register may transmit a credit card number received from the mobile phone to a local server, the local server may transmit the credit card number to a bank, and so forth. In this example, the credit card number may be stored at the mobile phone, the register, the local server, the bank, and at any other entity implemented within a payment environment. Sensitive data is vulnerable in such an environment to interception by unauthorized entities at multiple points, such as during each transmission between authorized entities or while stored at any authorized entity.

To prevent unauthorized access to sensitive data, steps can be taken to protect the sensitive data. Such data protection measures are required by many jurisdictions for various categories of sensitive data. The sensitive data can be encrypted during transmission or storage using an encryption algorithm and encryption key. However, encryption can be overcome/broken using a variety of hacking methods, and the use of encryption in financial systems is often subject to resource-intensive audit requirements. Data storage security measures can be implemented while the sensitive data is stored at an authorized entity, but such storage security measures generally protect against intrusion by an unauthorized entity and do not protect the sensitive data after the unauthorized entity has overridden or bypassed the storage security measures.

SUMMARY

Sensitive data, such as communication data or payment information, is tokenized in a mobile environment or a payment environment. A mobile device identifies data for communication, such as communication information entered by a user or as part of a communication or security protocol. In response, the mobile device retrieves device information and/or session information. The mobile device identifies one or more tokenization parameters based on the retrieved device information and/or the retrieved session information, and tokenizes the identified data for communication based on the identified tokenization parameters. The mobile device transmits the tokenized data to a communication system for processing.

A payment terminal can receive payment information associated with a transaction requested by a user, such as a credit card number or bank account number. The payment terminal identifies transaction information associated with the transaction, such as a transaction amount or a geographic region. The payment terminal identifies a set of tokenization parameters based on the identified transaction information, and tokenizes the received payment information based on the set of identified tokenization parameters. The payment terminal then stores the tokenized payment information if the payment terminal is offline relative to a central payment system, or transmits the tokenized payment in formation if the payment terminal is online relative to the central payment system.

A payment terminal can receive payment information associated with a transaction, and can tokenize the received payment information based on a first set of tokenization parameters. The payment terminal sends the tokenized payment information to a central payment system or other payment entity configured to detokenize and retokenize or to secondarily tokenize the tokenized payment information based on a second set of tokenization parameters. The central payment system or other payment entity can subsequently transmit the tokenized payment information to a payment network associated with the transaction.

A user can submit payment information to a central security system and can receive a token card for storage at a mobile device of the user based on one or more use rules selected by the user. The mobile device can display stored token cards, and in response to receiving a request for a transaction from the user, can allow the user to select a displayed token card for use in the transaction. The selected token card is transmitted to a central payment system configured to identify the use rules used in generating the token card and to determine whether the identified use rules are satisfied by the transaction. Responsive to a determination that the use rules are satisfied by the transaction, the central payment system is configured to detokenize the selected token card and to send the detokenized payment card to a payment network for authorization and processing.

Figure 1:
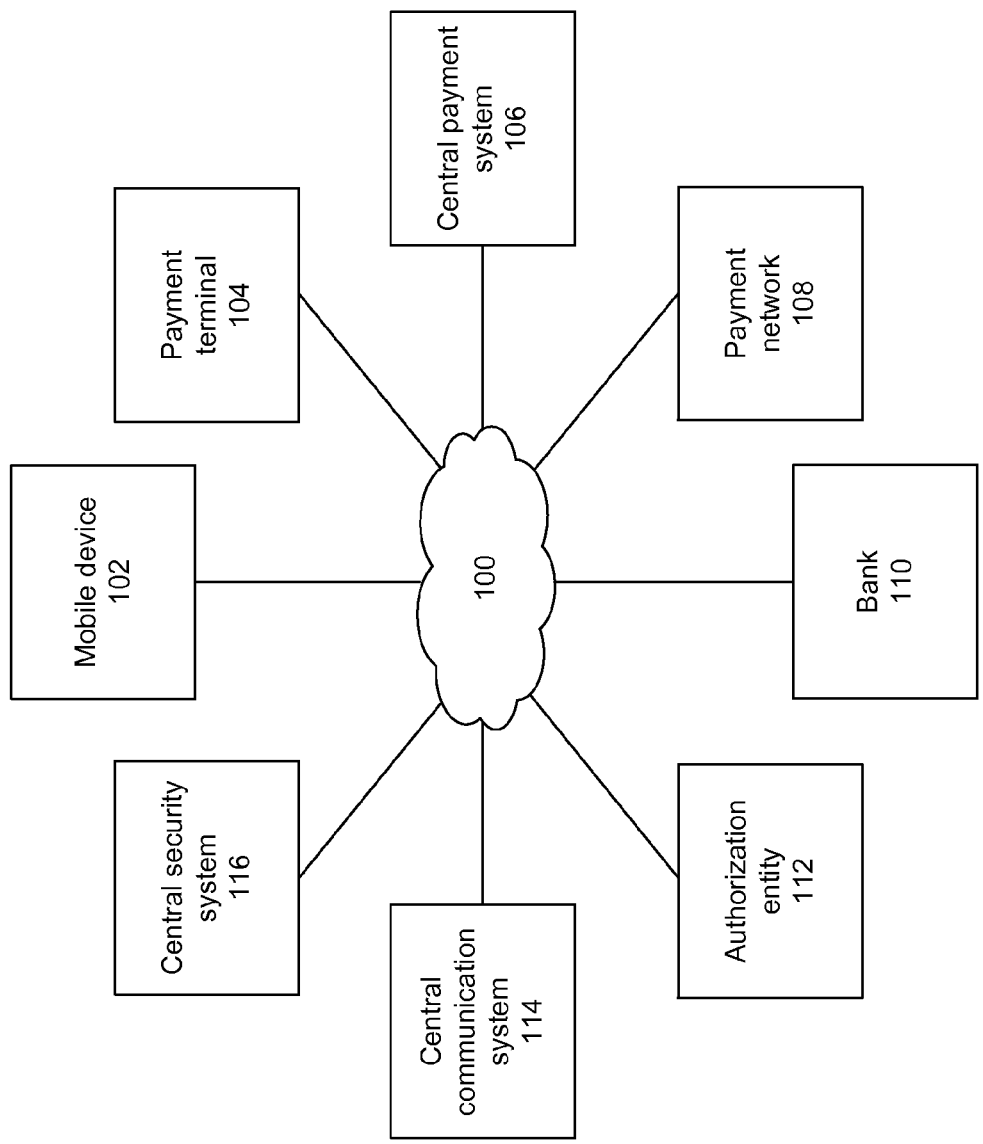
FIG. 1 illustrates a mobile and payment environment, according to one embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

Tokenization Overview

As used herein, the tokenization of data refers to the generation of tokenized data by querying one or more token tables mapping input values to tokens with one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data.

As used herein, the term token refers to a string of characters mapped to an input string of characters in a token table, used as a substitute for the string of characters in the creation of tokenized data. A token may have the same number of characters as the string being replaced, or can have a different number of characters. Further, the token may have characters of the same type (such as numeric, symbolic, or alphanumeric characters) as the string of characters being replaced or characters of a different type. Tokens can be randomly generated and assigned to a particular token table input value.

Any type of tokenization may be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and may include every possible input string value. The second column of an SLT includes tokens, with each associated with an input string value of the first column. Each token in the second column may be unique among the tokens in the second column. Optionally, the SLT may also include one or several additional columns with additional tokens mapped to the input string values of the first column. A seed value can be used to generate an SLT, for instance by generating random numbers based on the seed value for each token in the SLT.

In some embodiments, to increase the security of tokenization, sensitive data can be tokenized two or more times using the same or additional token tables. Each successive tokenization is referred to as a "tokenization iteration" herein. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data may also be left un-tokenized; thus a first subset of the resulting tokenized data may contain portions of the sensitive data and a second subset of the tokenized data may contain a tokenized version of the sensitive data.

Dynamic token lookup table ("DLT") tokenization operates similarly to SLT tokenization, but instead of using static tables for multiple tokenizations, a new token table entry is generated each time sensitive data is tokenized. A seed value can be used to generate each DLT. In some embodiments, the sensitive data or portions of the sensitive data can be used as the seed value. DLTs can in some configurations provide a higher level of security compared to SLT, but can also require the storage and/or transmission of a large amount of data associated with each of the generated token tables. While DLT tokenization can be used to tokenize data according to the principles described herein, the remainder of the description will be limited to instances of SLT tokenization for the purposes of simplicity The security of tokenization can be further increased through the use of initialization vectors ("IVs"). An IV is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

As used herein, "tokenization parameters" refers to the properties or characteristics of a tokenization operation. For example, tokenizing data according to tokenization parameters can refer to but is not limited to one or more of the following: the generation of token tables for use in tokenizing the data; the identity of pre-generated token tables for use in tokenizing the data; the type and number of token tables for use in tokenizing the data; the number of tokenization iterations to perform; the type, number, and source of initialization vectors for use in modifying the data prior to tokenization; and encryption operations to perform on the data before or after tokenization. Tokenization and initialization vectors are described in greater detail in U.S. patent application Ser. No. 13/595,438, titled "Multiple Table Tokenization", filed Aug. 27, 2012, the contents of which are hereby incorporated by reference.

Mobile and Payment Environment Overview

FIG. 1 illustrates a mobile and payment environment, according to one embodiment. The environment of FIG. 1 includes a mobile device 102, a payment terminal 104, a central payment system 106, a payment network 108, a bank 110, an authorization entity 112, a central communication system 114, and a central security system 116. The entities of FIG. 1 are, include, or are implemented within computing devices and are configured to transmit and receive data through a connecting network 100. In other embodiments, the mobile and payment environment of FIG. 1 can include additional or different entities, and the entities illustrated can perform functionalities differently or other than those described herein. In addition, although only one of each type of entities are illustrated in FIG. 1, any number of any type of entity may be included in the mobile and payment environment.

The connecting network 100 is typically the Internet, but may be any network, including but not limited to a LAN, a MAN, a WAN, a mobile wired or wireless network, a private network, a virtual private network, a direct communication line, and the like. The connecting network can be a combination of multiple different networks. In such embodiments, the tokenization system can be implemented at, within, or co-located with an entity illustrated in FIG. 1, and can include both inner- and inter-entity communication lines.

The mobile device 102 is a computing device such as a mobile phone, a tablet computer, or a laptop computer. In some embodiments, the mobile device is a traditionally non-mobile entity, such as a desktop computer, a television, and the like. The mobile device includes software configured to allow a user of the mobile device to interact with other entities within the environment of FIG. 1. For example, the mobile device can include a mobile wallet application or other payment application configured to allow a user to use the mobile device to transmit payment information when conducting a transaction, for instance at a store or restaurant. The mobile device can also include a communication application configured to allow a user to use the mobile device to communication with other entities and other mobile devices. Generally, the mobile device communicates wirelessly (for instance via Bluetooth, near field communication or "NFC", or mobile phone networks), though wired communication technologies may also be used.

As used herein, "transaction" refers to the exchange of funds for goods or services. Funds can be exchanged by providing payment information from a first payment entity to a second payment entity. As used herein, "payment information" can include credit card numbers, debit card numbers, bank account numbers, PIN numbers, gift card numbers, ticket and other pay-card information (such as identifying information or account balance information), identity information, or any other information used to conduct financial transactions. It should be noted that in some embodiments, a transaction can involve the providing of cash to a user of an ATM terminal; in such instances, "goods or services" involves the transfer of cash from the ATM terminal to a user and the deduction of an equivalent amount of funds from a user account. As used herein, "payment entity" refers to an entity involved in the performance of a transaction, and can include, for example, any of the entities of the environment of FIG. 1, any applications running on the entities of the environment of FIG. 1, or any other entity associated with a transaction.

The payment terminal 104 is a computing device configured to allow a user to conduct a transaction, such as paying for goods or services, transferring funds, and the like. The payment terminal can be an ATM terminal, a ticket dispenser, a terminal co-located with a cash register at a store or restaurant, a hand-held mobile phone payment system, or any other computing device for use in conducting a transaction. The payment terminal can be configured to receive and transmit information associated with or characteristics of a transaction (hereinafter "transaction information") and payment information to other payment entities. Transaction information can include, but is not limited to, the identity of a user requesting/performing a transaction, a method of payment in a transaction, goods or services associated with the transaction, a price or cost associated with the transaction, the identity of an entity associated with the payment terminal or any other payment entity (such as a bank, store, business, and the like), a time/date of the transaction, and the like. The payment terminal can receive and communicate transaction information and payment information wirelessly, though in other embodiments, the payment terminal may also be equipped with a physical credit card reader, with a cash receiving/output means, with network cables, and the like.

Figure 7:
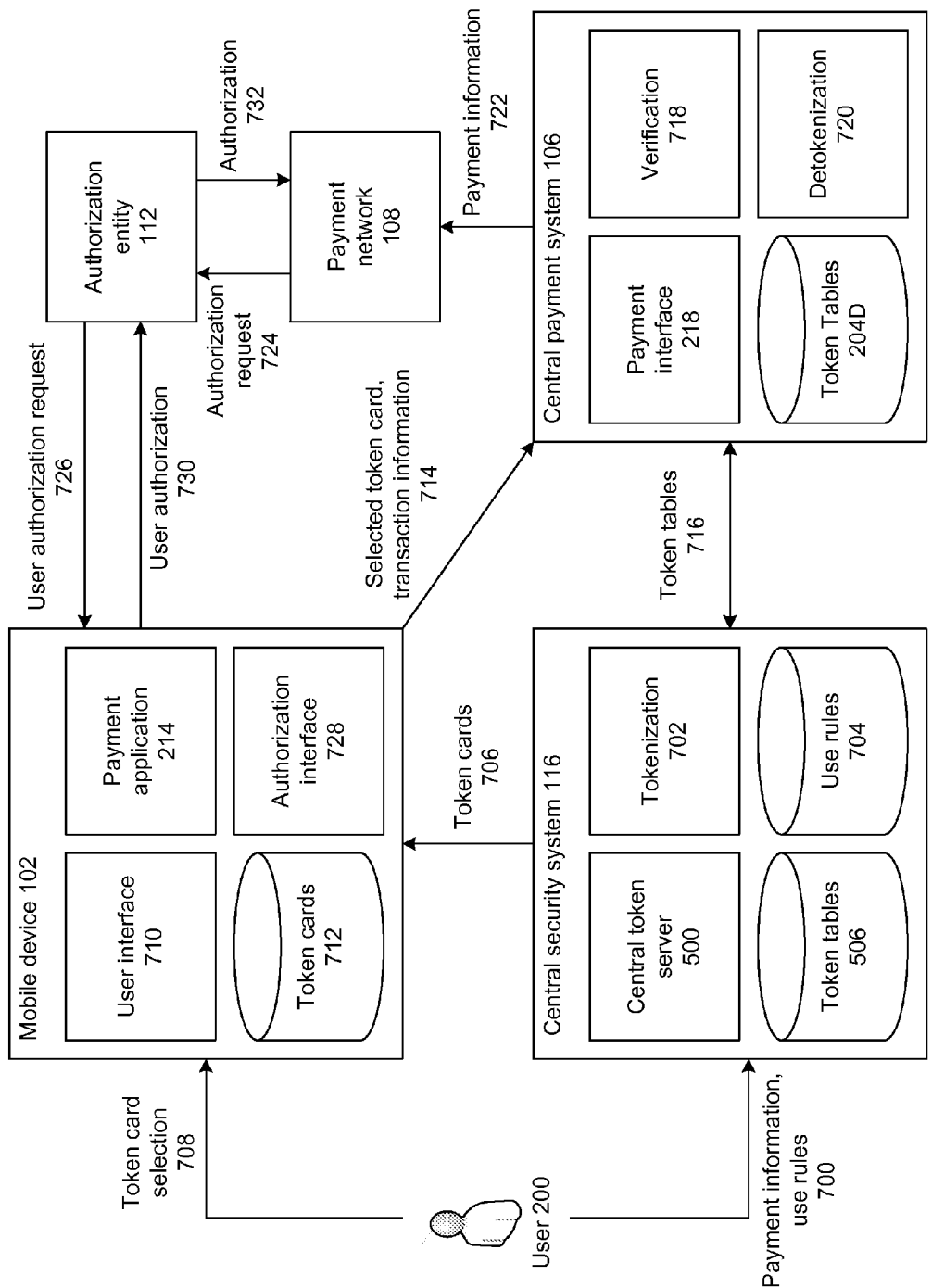
FIG. 7 illustrates data flow in a mobile and payment tokenization environment, according to one embodiment.

The payment terminal 104 includes a payment application (such as the payment application 214 described below in conjunction with FIGS. 2, 5, and 7) including executable software configured to run on the payment terminal. The payment application can be configured to allow the user 200 to conduct transactions via the payment terminal, for instance by allowing a user to provide payment information to other entities in exchange for goods or services, or to transfer funds. It should be noted that, as shown in the embodiment of FIG. 7, a payment application can also implemented in the mobile device 102, allowing a user to use the mobile device to conduct transactions.

The central payment system 106 is a computing device, such as a server, configured to provide a centralized payment interface between one or more payment terminals and one or more other payment entities, such as a payment network 108, a bank 110, and an authorization entity 112. The central payment system can receive a transaction request from a payment terminal, identify an associated payment entity, transmit payment information associated with the transaction request to the associated payment entity, receive an authorization or denial for the transaction from the associated payment entity, transmit the authorization or denial to the payment terminal, and process the transaction upon receiving an authorization. Alternatively, the payment terminals may communicatively couple to the central payment system only periodically; in such embodiments, a payment terminal may allow a user to conduct a transaction when the payment terminal is offline from the central payment system, may store offline transaction information and payment information at the payment terminal, and may upload the stored transaction information and payment information to the central payment system when the payment terminal next communicatively couples to the central payment system.

The payment network 108 includes a network of computing devices associated with various payment entities, such as credit card companies, debit card entities, online payment systems (such as Paypal and Google Wallet), coupon servers, merchant websites, payment gateways, and the like. The payment network is configured to receive transaction information and payment information from the central payment system 106, identify a payment entity associated with the transaction, and provide a communicative interface between the central payment system and the payment entity. The bank 110 includes one or more computing devices associated with a bank, such as web servers, financial servers, and the like. The bank 110 is configured to interface with the central payment system to conduct transactions, to allow for the transfer of funds, and to perform other financial functions. The authorization entity 112 is a computing device associated with any entity configured to communicate with the central payment system to authorize transactions by users of a payment terminal 104. For example, an authorization entity can be a credit agency, a debit card account balance server, a gift card balance server, and the like. Although illustrated separately, the payment network, the bank, and the authorization entity can be implemented within the same computing device or network, and any number of payment networks, banks, and authorization entities can be present in the environment of FIG. 1.

The central communication system 114 is configured to provide a communicative interface between a mobile device 102 and one or more other entities, such as one or more payment entities, other mobile devices and computing devices, web sites, email servers, and the like. The central communication system can include a communication server, a cell phone tower, a router, a wireless station or access point, a web server, or any other communicative computing system configured to receive and send communication information to and from communicating entities. The central communication system can include and implement a variety of communication protocols in operation, and in various embodiments can provide webpages, SMS functionality, email routing, and the like between entities.

The central security system 116 is configured to provide a centralized security interface between entities in the environment of FIG. 1. The central security system can generate, store, and provide token tables to the various entities, for instance in response to a request from the central communication system 114 or a payment terminal 104. The central security system can also provide security use rules, encryption keys, credential information, initialization vectors, and any other security information for use in securing data transferred between entities in the environment of FIG. 1. In one embodiment, the central security system 116 is configured to receive credential information, for instance a password from a user or authorization credentials from a bank 110, and to authenticate the credential information prior to providing security information to an entity in the environment of FIG. 1.

Figure 2:
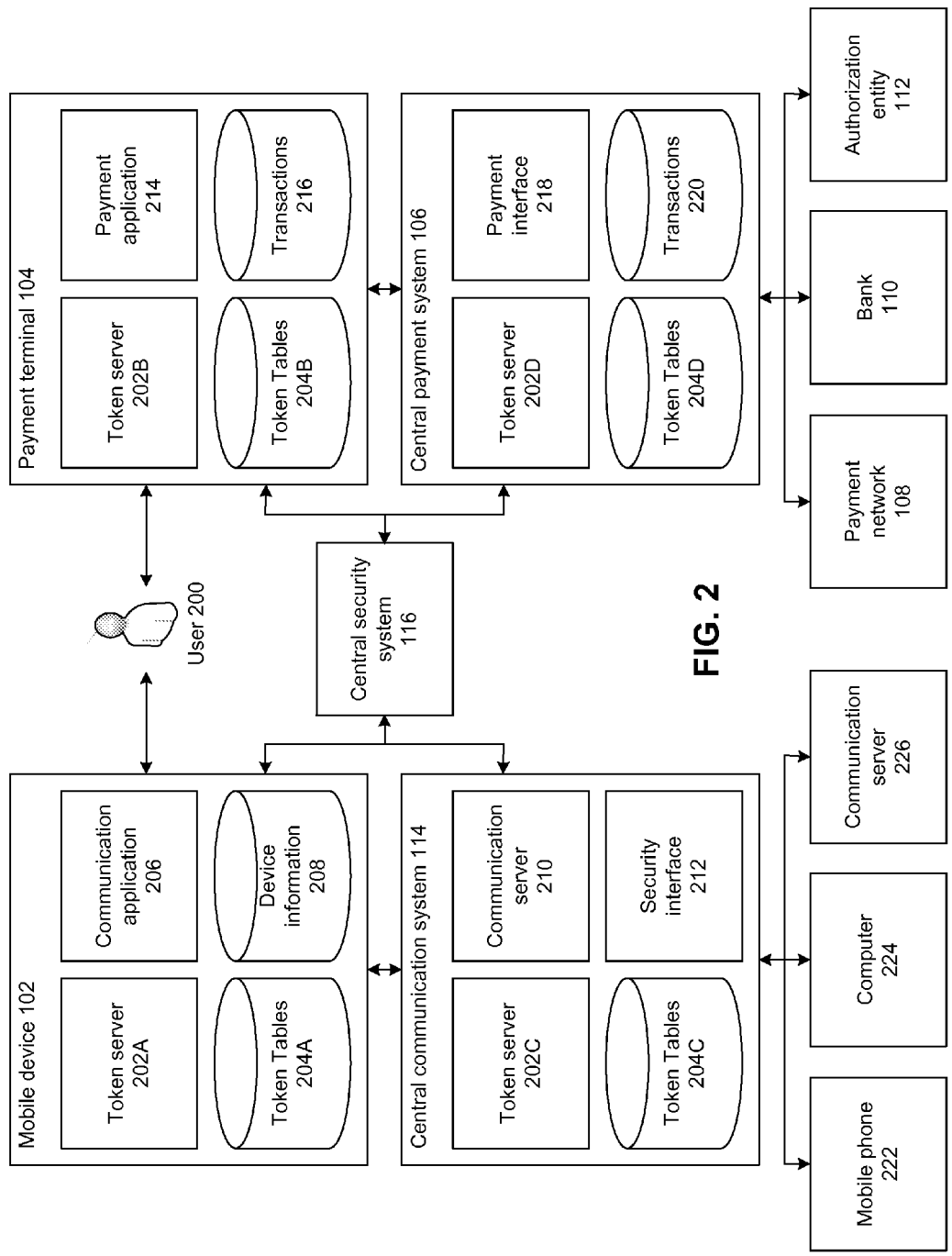
FIG. 2 illustrates a mobile and payment tokenization environment, according to one embodiment.

FIG. 2 illustrates a mobile and payment tokenization environment, according to one embodiment. The environment of FIG. 2 includes a mobile device 102, a payment terminal 104, a central payment system 106, and a central communication system 114. The mobile device, payment terminal, central payment system, and central communication system are communicatively coupled to a central security system 116. The central communication system is additionally communicatively coupled to a mobile phone 222, a computer 224, and a communication server 226. The central payment system is additionally communicatively coupled to a payment network 108, a bank 110, and an authorization entity 112. Any number of each entity may be present in FIG. 2, and fewer, additional, or different entities may be present. In some embodiments, various entities can be implemented within a single entity, for instance the payment terminal can be implemented within the mobile device.

The mobile device 102, the payment terminal 104, the central communication system 114, and the central payment system 106 each include a token server (token server 202A, 202B, 202C, and 202D, respectively; "token servers 202" collectively) and a token tables storage module (204A, 204B, 204C, and 204D, respectively; "token tables storage modules 204" collectively). Each token table storage module 204 stores token tables for use in tokenization. The token tables storage modules can store token tables received from various sources, such as the central security system 116, the components of the entity with which each token tables storage module is part, or other entities within the environment of FIG. 2.

Each token server 202 is configured to retrieve token tables stored in a respective token tables storage module 204, and serve the retrieved token tables to various respective entity components. For example, the token server 202A is configured to retrieve token tables stored in the token tables storage module 204A and to provide the retrieved token tables to the communication application 206. Similarly, the token server 202B is configured to serve retrieved token tables to the payment application 214, the token server 202C is configured to serve retrieved token tables to the security interface 212, and the token server 202D is configured to serve retrieved token tables to the payment interface 218.

The token servers 202 are also configured to store received token tables in the token tables storage modules 204. Each token server can receive token tables from the central security system 116, from respective entity components, or from other token servers. For example, the token server 202A can store token tables generated by and received from the communication application 206, received from the central security system 116, and received from the token server 202C.

Each token server 202 can also serve token tables to other token servers. For example, the token server 202A can serve one or more token tables used in tokenization by the communication application 206 to the token server 202C for use in detokenization by the security interface 212, and for storage in the token tables storage module 204C. Similarly, the token server 202B can serve one or more token tables used in tokenization by the payment application 214 for use in detokenization by the payment interface 218, and for storage in the token tables storage module 204D.

The central security system 116 provides token tables to the token servers 202 for storage in the token tables storage modules 204. The central security system can provide one or more token tables periodically (for instance, every day, hour, or other time period); in response to a request for tokens from a token server 202; from the communication application 206, the security interface 212, the payment application 214, or the payment interface 218; in response to a certain number of tokenization operations by one or more of the entities of FIG. 2; in response to a transaction or communication request from the user 200; and the like. The central security system can provide pre-generated token tables stored at the central security system, or can generate token tables in response to receiving a request for token tables. Token tables stored at the central security system and the token tables storage modules can be associated with identifiers such that a token server 202 can request a particular token table. For example, if the communication application uses token table "X7m2" to tokenize data, the security interface can use the identifier "X7m2" to retrieve the same token table from the token tables storage module 204C for use in detokenizing the tokenized data.

Tokenization in a Mobile Environment

A user 200 can use the mobile device 102 to transmit communication information to the central communication system 114. In one embodiment, the mobile device can be a mobile phone configured to make phone calls and/or send text messages to the central communication system, which can be a phone service provider, a mobile phone communication tower, and the like. Alternatively, the mobile device can be a computer configured to send emails or other messages to or to communicate over any wired or wireless communication protocol, the selection of which is not material to the invention. As used herein, "communication data" refers to any information sent from the mobile device to the central communication system.

The mobile device 102 includes the token server 202A, the token tables storage module 204A, the communication application 206, and the device information storage module

208. The central communication system 114 includes the token server 202C, the token tables storage module 204C, the communication server 210, and the security interface 212. The communication application is configured to identify communication data, to identify device information and/or session information, to tokenize the communication data based on the device and/or session information, and to send the tokenized communication data to the central communication system. The communication server provides a communicative interface between the central communication system and other entities (such as the mobile device, the mobile phone 222, the computer 224, and the communication server 226) by receiving and routing communication data between entities. The security interface is configured to implement various tokenization-based security protocols for communication data received and routed by the communication server, as will be described below in detail.

The device information storage module 208 stores information describing the mobile device 102 (hereinafter "device information"). For example, device information can include the brand or manufacturer of the mobile device, the make or model of the mobile device, identifying information associated with a mobile device SIM card, a phone number associated with the mobile device, a MAC address or IP address associated with the mobile device, a serial number of the mobile device, a wireless server provider associated with the mobile device, information identifying a user of the mobile device (such as a user name, a password, and the like), or any information associated with the mobile device.

The device information storage module 208 can also store information associated with use of the mobile device 102 (hereinafter "session information"). For example, session information can include the number of times that the mobile device has previously communicated with the central communication system 114, the time and/or date of the previous communication between the mobile device and the central communication system, the length of a previous communication session or the total length of all communication sessions between the mobile device and the central communication system, a session identifier identifying the current session between the mobile device and the communication system, or any information identifying the historical activity of the mobile device and/or the communication system. It should be noted that both the device information and the session information stored at the device information storage module can also be stored at the central communication system.

The communication application 206 identifies and tokenizes communication data. In one embodiment, the communication data can be data entered by the user 200, such as a text message, an email, a web search query, and the like. Alternatively, the communication data can be data required to implement a communication protocol, such as session establishing information, session continuance information, communication information formatted according to the communication protocol, access rights information, device identification information, and the like. For example, the communication data can be data required to establish a connection between the mobile device and central communication system in order for the user to make a phone call, to connect the mobile device to a wireless network implemented by the central communication system, and the like.

The communication application 206 receives a security protocol from the central communication system 114 and retrieves device and/or session information from the device information storage module 208 for use in tokenizing the identified communication data based on the received security protocol. The received security protocol received specifies tokenization parameters for the communication application to identify and specifies retrieved device information and/or session information on which to identify the tokenization parameters.

A security protocol can specify that token table identities are to be determined based on particular retrieved device information and/or session information. A communication application implementing such a security protocol can identify a token table based on, for example, a phone number associated with the mobile device 102. A security protocol can also specify that token tables are to be generated based on the particular device information and/or session information. A communication application implementing such a security protocol can use, for example, a SIM card number as a seed value to generate token values for a token table, or can send a session identifier to the central security system 116 for use in generate token tables.

A security protocol can specify that IVs can be determined based on particular device information and/or session information. A communication application implementing such a security protocol can use, for example, the last four digits of a phone number associated with the mobile device 102 as an IV, or can use the time of the previous communication between the mobile device and the central communication system 114 to query an IV table to retrieve an IV. A security protocol can specify that portion of the identified communication data for tokenization based on device information and/or session information. A communication application implementing such a security protocol can identify, for example, the first four digits of the identified communication data if the date of the previous communication between the mobile device and the central communication system was between 1 and 4 days ago, the second four digits if the date of the previous communication was between 5 and 8 days ago, and so forth.

A security protocol can specify other tokenization parameters based on the device information and/or session information. For example, a communication application can determine a type of tokenization to use in tokenizing the identified communication data based on a geographic location of the mobile device 102, a number of tokenization iterations based on a time of day, a number of IVs for use in tokenization based on a brand of the mobile device, a type of modification to perform on the identified communication data with one or more IVs based on the identity of the user 200, an encryption to perform on the identified communication data before or after tokenization based on the strength of wireless connection between the mobile device and the central communication system 114, or any other tokenization parameter based on any other device and/or session information.

Upon identifying one or more tokenization parameters based on device and/or session information, the communication application 206 tokenizes the identified communication data based on the identified tokenization parameters. For example, if the tokenization parameters include a) the identity of a token table for retrieval from the token tables storage module 204A, b) an IV based on the first 4 bits of the identified communication data, and c) a determination that the last 6 bits of the identified communication data are to be modified with the IV and tokenized, then the communication application modifies the last 6 bits of the identified communication data with the first 4 bits, and tokenizes the modified data using the retrieved token table to produce tokenized communication data. The communication application then sends the tokenized communication data to the central communication system 114, where it is received by the communication server 210.

The communication server 210 receives tokenized data from the communication application 206. The communication server can store the received tokenized data in a communication storage module (not shown in FIG. 2), or can route it to another entity (such as the mobile phone 222, the computer 224, or the communication server 226). The communication server can also respond to receiving tokenized data, for instance by informing the communication application that the tokenized data was received.

The security interface 212 is configured to implement one or more security protocols for use in tokenizing communications between the mobile device 102 and the central communication system 114. As noted above, the security protocols implemented by the security interface specify tokenization parameters for the communication application 206 to identify, and can specify the device information and/or the session information based on which the communication application identifies the tokenization parameters. For example, a security protocol implemented by the security interface can specify that the first 7 digits of a phone number associated with the mobile device be used by the communication application to identify a token table for use in tokenizing the communication data.

The security interface 212 can implement security measures for communications between the mobile device 102 and the central communication system unrelated to tokenization. For example, the security interface can require that the communication application establish a secure or encrypted connection prior to establishing a communication session between the mobile device and the central communication system 114. In such an example, the communication application uses device and/or session information specified by the security interface as an encryption key for encrypting communication data, and upon the receipt of the encrypted communication data by the communication server, the security interface decrypts the encrypted communication data using device information and/or session information received from the mobile device or stored at the central communication system.

The security interface 212 can require the communication application 206 to authenticate the identity of the user 200 or the mobile device 102 prior to establishing a communication session between the mobile device and the central communication system 114. For example, the security interface can require that the communication application tokenize a pre-determined data string by using a phone number of the mobile device to identify a token table stored in the token tables 204A and tokenizing the pre-determined string with the phone identified token table. Upon the receipt of such a tokenized string by the communication server 210, the security interface can tokenize the same pre-determined data string by using a phone number known to be associated with the mobile device to identify a token table stored in the token tables storage module 204C and tokenizing the pre-determined string with the identified token table. If the tokenized string received from the communication application matches the string tokenized by the security interface, the security interface can determine that the identity of the mobile device is authentic, and can permit the establishment of the communication session.

The security interface 212 can require the mobile device 102 to re-authenticate itself periodically, or before each new communication session. In one embodiment, session information representing a session count is stored by the mobile device and the central communication system 114. After each communication session between the mobile device and the central communication system, the session count stored by each is incremented. In this embodiment, the security interface can require the communication application 206 to tokenize communication data using the session count, for instance as a token table identifier, an encryption key, or an IV.

The security interface 212 can require the communication application 206 to obtain a particular set of token tables for use in tokenizing communication data for a communication session. For example, the security interface can require the communication application to request and obtain (via the token server 202A and the token server 202C) a set of token tables stored at the token tables storage module 204C. Likewise, the security interface can require the communication application to obtain (via the token server 202A) a set of token tables from the central security system 116 for use in a communication session, and can retrieve (via the token server 202C) the same set of token tables, for instance in response to receiving communication data tokenized with the set of token tables from the communication application.

The security interface 212 can detokenize received tokenized communication data prior to the storage or routing of the communication data by the communication server 210. For example, if the central communication system 114 is securely coupled to the communication server 226, the security interface can detokenized received tokenized communication data, such as an email, and can serve the detokenized email to the communication server 226 for delivery to an intended recipient. The security interface can also re-tokenize detokenized communication data prior to storage or routing. For example, the security interface may require a first level of security be implemented between the mobile device 102 and the central communication system, and a second level of security be implemented between the central communication system and the computer 224. Accordingly, the security interface can detokenize communication data from the mobile device tokenized according to the first level of security, and can re-tokenize the communication data according to the second level of security prior to the serving of the communication data to the computer by the communication server.

It should be noted that in order to detokenize communication data received from the mobile device 102, the security interface 212 may be required to access to the token tables used by the communication application 206 to tokenize the communication data. As noted above, in certain embodiments, the token server 202A receives token tables stored at the token tables storage module 204C via the token server 202C, or the token server 202A and the token server 202C each receive token tables from the central security system 116. In embodiments in which the communication application 206 generates token tables based on device information and/or session information for use in tokenization, the security interface can request the generated token tables from the token server 202A via the token server 202C, or can generate the same token tables using the device information and/or session information (for instance, if the device information and session information is also stored at the central communication system 114, or in response to requesting and receiving such information from the mobile device). In one embodiment, the token servers 202A and 202C synchronize token tables stored at the token tables storage modules 204A and 204C periodically.

Figure 3:
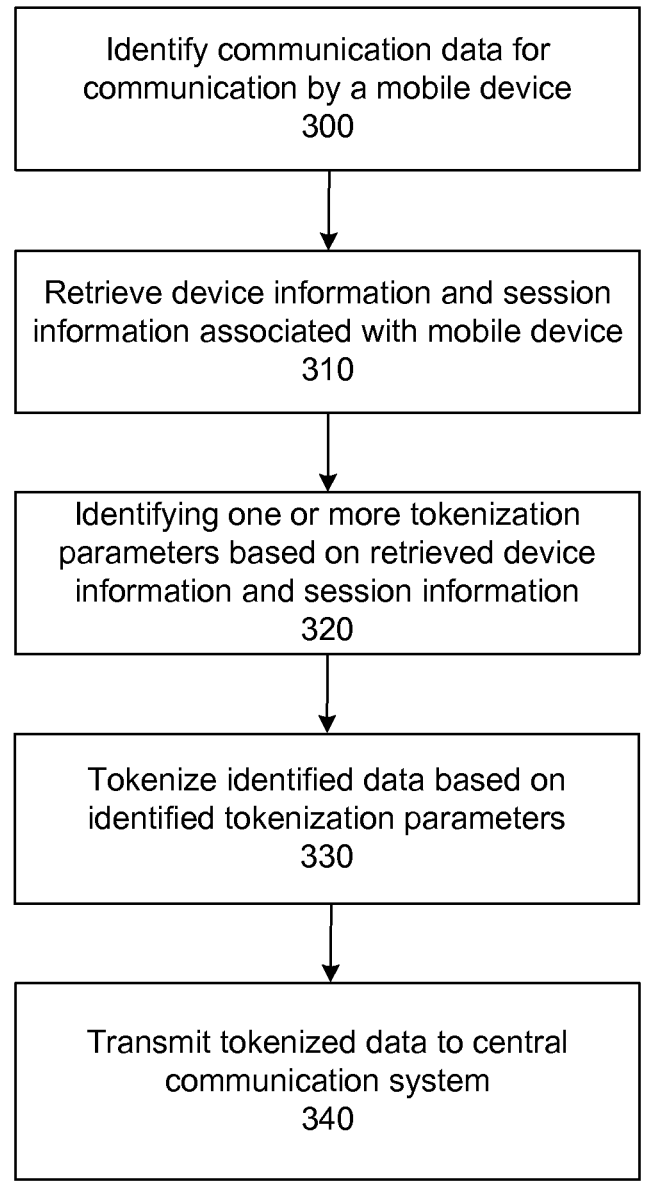
FIG. 3 is a flowchart of a process for the tokenization of data in a mobile environment, according to one embodiment.

FIG. 3 is a flowchart of a process for the tokenization of data in a mobile environment, according to one embodiment.

A mobile device identifies 300 communication data to be communicated. The communication data can be data entered by a user of the mobile device (such as a text message or email), can be data required for the establishment of a communication session (such as authentication information), or can be data required for communication using a particular communication protocol (such as WiFi or VoIP).

The mobile device retrieves 310 device information and/or session information associated with the mobile device, for instance based on a received security protocol. Examples of device information include a phone number of the mobile device, a SIM card number of the device, and a serial number of the mobile device. Examples of session information include a date and time of a previous communication session by the mobile device, a communication session count, and a session identifier.

The mobile device identifies 320 one or more tokenization parameters based on the retrieved device information and/or session information, for instance as specified in a received security protocol. For example, one or more token tables can be retrieved or generated based on a phone number of the mobile device, an IV can be generated based on the session count associated with the mobile device, and an encryption key can be generated for use in encrypting the tokenized data prior to communication based on an identity of the user of the mobile device. The mobile device tokenizes 330 the identified data based on the identified tokenized parameters, and transmits 340 the tokenized data to a central communication system.

Tokenization in a Payment Environment

Returning to FIG. 2, a user 200 can use the payment terminal 104 to conduct a financial transaction. In addition to the token server 202B and token tables storage module 204B as described above, the payment terminal includes a payment application 214 and a transactions storage module 216. The payment application is configured to receive payment information from the user, to tokenize the payment information, and to store or transmit the tokenized payment information. The payment application can include, for example, a user interface presenting the user with various selectable transaction information (such as a description of a good or service, a price associated with the transaction, and various options for providing payment information). In various embodiments, the user selects one or more options associated with a transaction, is presented with a price associated with the transaction, and provides payment information by swiping a credit card at a card reader of the payment terminal.

The payment terminal 104 transmits tokenized payment information to and otherwise communicates with the central payment system 106. The payment terminal can alternate between being communicatively coupled and communicatively uncoupled from the central payment system. For example, the payment terminal may communicatively couple to the central payment system periodically, such as once an hour or once a day, or may communicatively couple to the central payment system at a pre-determined time or in response to a request from the central payment system. The payment terminal is referred to herein as "online" when communicatively coupled to the central payment system, and "offline" when communicatively uncoupled from the central payment system.

The payment application 214 is configured to allow a user 200 to conduct transactions when the payment terminal 104 is both online and offline. Upon receiving a request for a transaction from a user, the payment application can receive payment information from the user, can tokenize the received payment information, and can determine whether the payment terminal is online or offline. In response to a determination that the payment terminal is offline, the payment application can store the tokenized payment information in the transactions storage module 216. In response to a determination that the payment terminal is online, the payment application can transmit the tokenized payment information to the central payment system 106.

The payment application 214 tokenizes the received payment information by accessing one or more token tables (identified, for instance, by one or more tokenization parameters as described below) and tokenizing all or part of the payment information using the accessed token tables. To access the token tables, the payment application can request token tables from the token server 202B, which, as described above, is configured to retrieve the requested token tables from the token tables storage module 204B. Upon retrieving the requested token tables, the token server 202B provides the retrieved token tables to the payment application.

The payment application 214 identifies one or more tokenization parameters for use in tokenizing the received payment information. In one embodiment, the tokenization parameters are identified based on transaction information associated with the transaction being conducted. It should be noted that any tokenization parameter can be identified based on any combination of transaction information. The payment application may also identify one or more tokenization parameters based on default or requested security protocols, or based on any other suitable factor.

The payment application can identify one or more token tables for retrieval or generation by the token server 202B based on the transaction information. For example, the payment application can identify a token table identifier or a seed value for generating token tables based on a time of transaction or a transaction price. Similarly, the payment application can identify, based on transaction information, an IV for use in tokenization, a type of modification to perform on the payment information based on an IV, a portion of the payment information to tokenize, a type of tokenization or number of tokenization iterations to perform, an encryption algorithm and/or encryption key for use in encrypting the payment information before or after tokenization, transaction information to combine with the payment information before or after tokenization, or any other tokenization parameter. In one embodiment, instead of identifying tokenization parameters based on transaction information, the payment application can identify tokenization parameters based on a default security protocol or based on a security protocol implemented by the central payment system 106.

Upon identifying one or more tokenization parameters, the payment application 214 tokenizes the payment information based on the tokenization parameters. For example, if the identified tokenization parameters include the identity of token tables retrieved from the token tables storage module 204B and an encryption algorithm and key, the payment application encrypts the payment information using the encryption algorithm and key, and tokenizes the encrypted payment information using the retrieved token tables. As noted above, the payment terminal can store the tokenized payment information in the transactions storage module 216 if the payment terminal is offline, and can transmit the tokenized payment information to the central payment system 106 if the payment terminal is online Tokenized payment information stored at the transactions storage module can be stored until the payment terminal comes online (e.g., when the payment terminal becomes communicatively coupled to the central payment system 106), in response to which the payment application can output the stored tokenized payment information to the central payment system. Alternatively, the payment terminal can output the stored tokenized payment information upon a request from the central payment system, or after tokenized payment information representing a threshold number of transactions is stored.

In addition to the token server 202B and the token tables storage module 204B as described above, the central payment system 106 includes a payment interface 218 and a transactions storage module 220. The payment interface is configured to receive tokenized payment information from the payment application payment terminal 104, and to route payment information to one or more financial entities, such as the payment network 108, the bank 110, the authorization entity 112, or any other financial entity not illustrated in the embodiment of FIG. 2. In an example transaction, upon the swiping of a credit card by a user 200 and the subsequent tokenization and outputting of the credit card number to the central payment system, the payment interface can route the tokenized credit card number to the authorization entity, can receive authorization for the transaction, and can output the tokenized credit card number to the payment network for processing and completion of the transaction.

The payment interface 218, prior to routing received tokenized payment information, can store the tokenized payment information in the transactions storage module 220. Tokenized payment information associated with multiple transactions can be aggregated at the transactions storage module, and the payment interface can route the aggregated tokenized payment information periodically, at a pre-determined time, after a threshold number of transactions, or in response to a request from a payment entity, such as the payment network 108, the bank 110, or the authorization entity 112. In an example where the payment terminal 104 is an ATM terminal, the central payment system can store and aggregate tokenized payment information at the transactions storage module until tokenized payment information associated with 100 transactions is stored, upon which the payment interface outputs the tokenized payment information representing the 100 transactions to the bank. In some embodiments not described further herein, the payment terminal communicatively couples directly to and transmits tokenized payment information to the payment network, the bank, or the authorization entity, bypassing the central payment system.

In one embodiment, the payment interface 218 detokenizes received tokenized payment information prior to storing the payment information at the transactions storage module 220, or prior to routing the payment information. In such an embodiment, the payment interface can re-tokenize detokenized payment information prior to storage or routing, for instance based on more robust tokenization parameters. Alternatively, instead of detokenizing received tokenized payment information, the payment interface can perform secondary tokenization on the tokenized payment information, thus increasing the security of the tokenized payment information further. In one embodiment, the payment application 214 can provide the tokenization parameters used to tokenize the payment information for each transaction to the payment interface for use in detokenizing the tokenized payment information. For example, if the payment application selects one or more token tables for use in tokenizing payment information based on the identity of the user 200, the payment application can output the identity of the user along with the tokenized payment information. The payment interface can then access the one or more tables used to tokenize the payment information based on the identity of the user for use in detokenizing the payment information.

The token tables used by the payment application 214 to tokenize payment information, and/or used by the payment interface 218 to detokenize, re-tokenize or secondarily tokenize payment information can be received from the central security system 116 as noted above. Received token tables are stored at the token tables storage module 204B and 204D. In one embodiment, the central payment system 106 receives token tables from the central security system or generates token tables, and provides token tables to the payment terminal 104 for use in tokenization. For example, the central payment system can provide new or updated token tables to the payment terminal upon the payment terminal coming online. In this example, upon the receipt of token tables from the central payment system by the payment terminal after coming online, the payment application uses the new or updated token tables for tokenization upon the payment terminal subsequently going offline until the payment terminal comes online again.

In one embodiment, after coming online after performing transactions while offline, the payment terminal 104 outputs stored tokenized payment information to the central payment system 106, and in response, the central payment system outputs a set of token tables to the payment terminal for use in subsequent tokenization. In embodiments where the payment application 214 generates token tables for use in tokenization, the payment terminal can output the generated token tables along with stored tokenized payment information to the central payment system, and the payment interface 218 can use the received token tables in detokenizing the tokenized payment information. It should be noted that the central payment system may be required to access the token tables used by the payment application to tokenize payment information before the payment interface 218 can detokenize the tokenized payment information.

Beneficially, tokenizing payment information prior to transmitting the payment information may eliminate various audit requirements imposed within financial institutions and systems. Though tokenization may be combined with encryption, tokenized data itself is not an encrypted representation of the original data. As described above, tokenized data includes one or more portions of the original data replaced with tokens within token table entries associated with the one or more portions of the original data. Thus, without access to the one or more token tables, the original data cannot be derived from the tokenized data. Accordingly, as unauthorized entities that intercept tokenized data cannot detokenize the data without access to the token tables used to tokenize the data, the need for various audits required by financial institutions and systems can be preempted.

Figure 4:
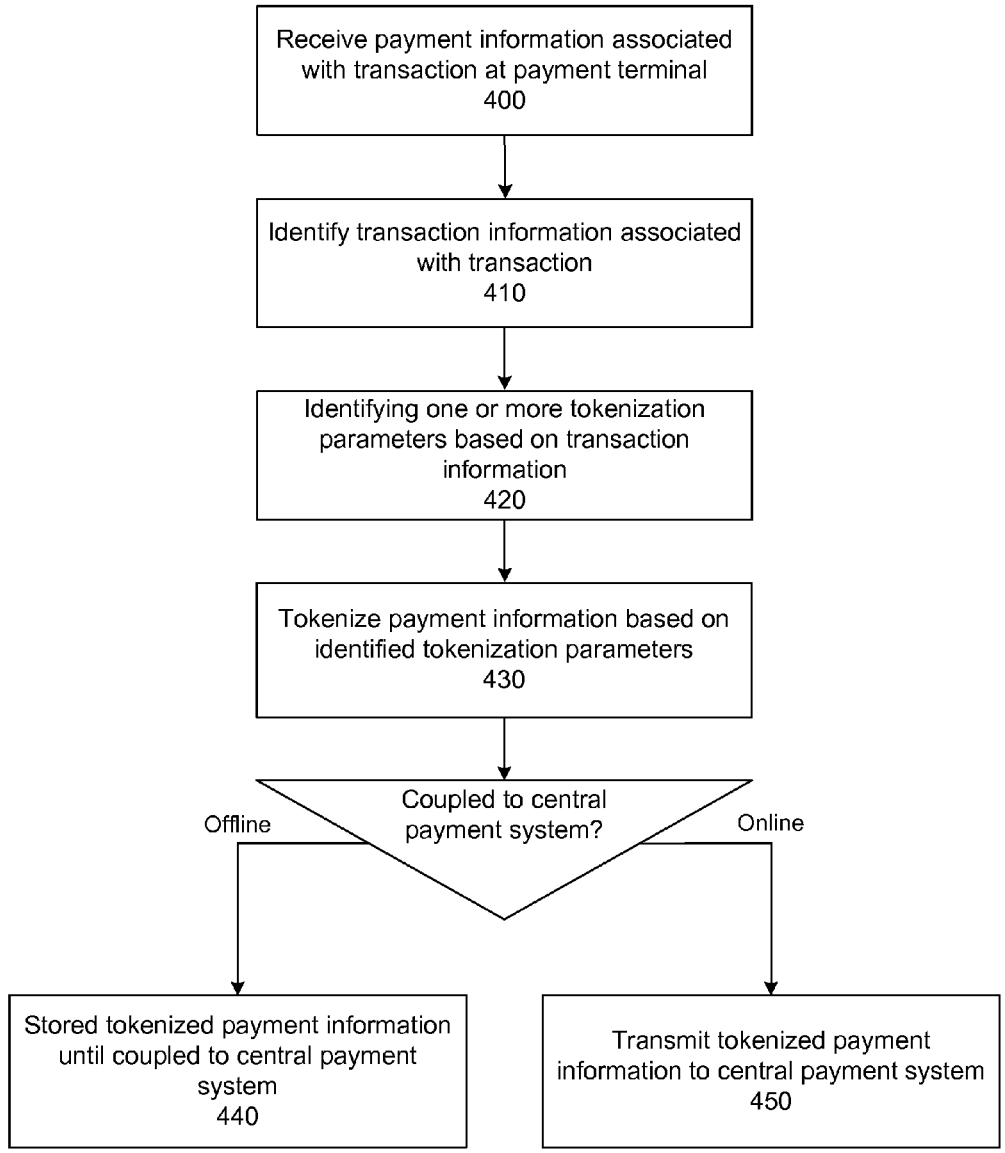
FIG. 4 is a flowchart of a process for the tokenization of data in a payment environment, according to one embodiment.

FIG. 4 is a flowchart of a process for the tokenization of data in a payment environment, according to one embodiment. A transaction can be requested by a user, for instance at a payment terminal, and in response, the payment terminal can prompt the user for payment information. The payment terminal receives 400 payment information associated with a transaction. The payment information can be a credit card number, a bank account number, or the like. The payment terminal identifies 410 transaction information associated with the transaction. Transaction information can include the time and date of the transaction, the identity of the user performing the transaction, the identity of a merchant associated with the transaction, the transaction payment method, the transaction amount/cost, and the like.

The payment terminal identifies 420 one or more tokenization parameters based on the transaction information. For example, one or more token tables can be identified based on a PIN number associated with the transaction, one or more token tables can be generated based on a user name associated with the user, a number of tokenization iterations can be identified based on the time of day of the transaction, and the like. The payment terminal tokenizes 430 the payment information based on the identified tokenization parameters. For example, if the tokenization parameters identify a set of token tables and an encryption algorithm, the payment information is tokenized using the set of token tables and the tokenized payment information is subsequently encrypted using the encryption algorithm.

In response to the payment terminal being communicatively uncoupled ("offline") from a central payment system associated with the payment terminal, the payment terminal stores 440 the tokenized payment information until the payment terminal becomes communicatively coupled to the central payment system. In response to the payment terminal being communicatively coupled ("online") to the central payment system, the payment terminal transmits 450 the tokenized payment information to the central payment system. In one embodiment, the tokenized payment information is transmitted from the payment terminal when coupled to the central payment system at a pre-determined time, at periodic intervals, or in response to a request from the central payment system.

Tokenization in a Distributed Payment Environment

Figure 5:
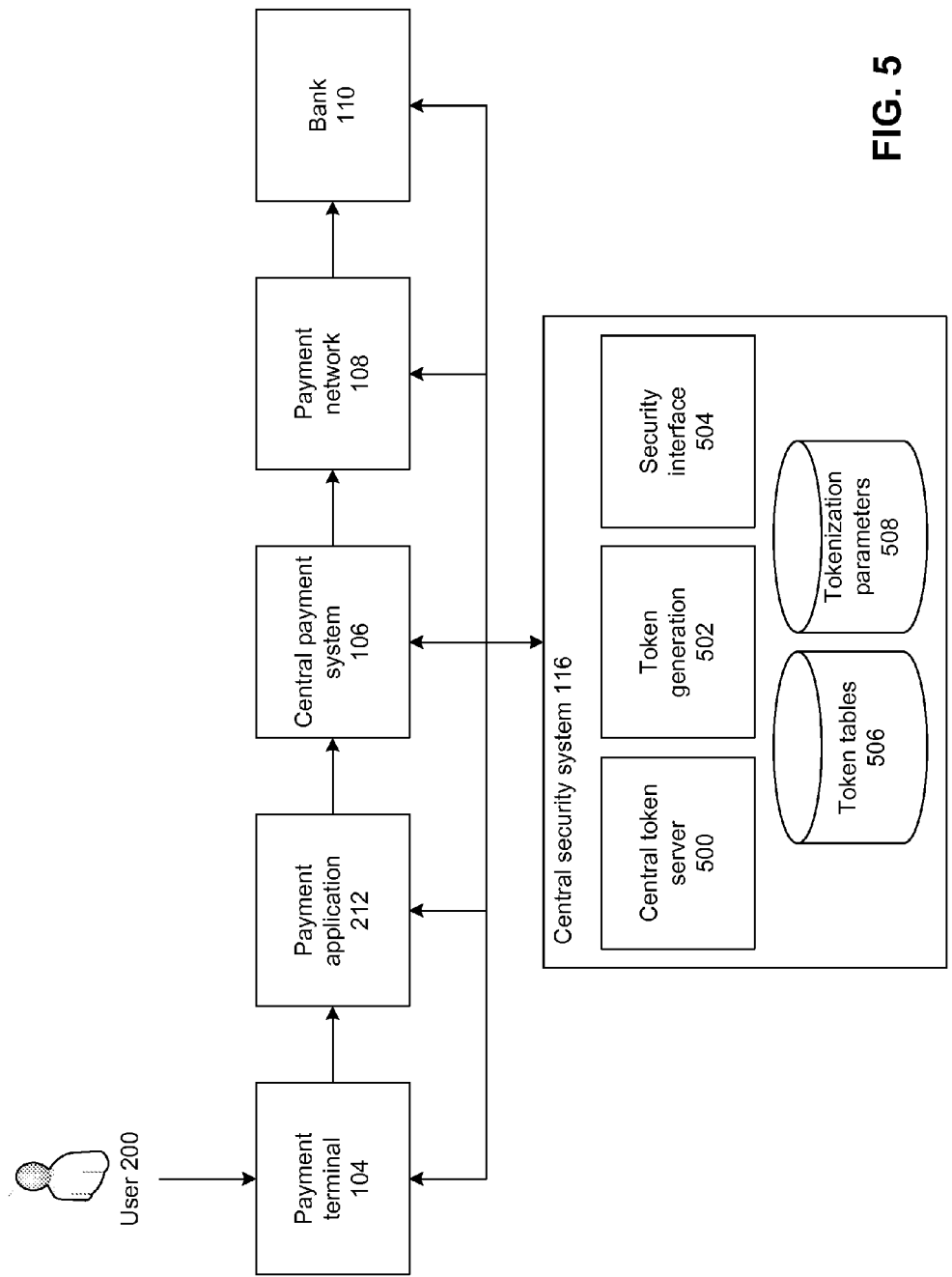
FIG. 5 illustrates a centralized security system in a distributed payment tokenization environment, according to one embodiment.

FIG. 5 illustrates a centralized security system in a distributed payment tokenization environment, according to one embodiment. It should be noted that the payment tokenization environment of FIG. 2 can be implemented within the distributed payment tokenization environment of FIG. 5. Accordingly, the features and functionalities described in conjunction to FIG. 2 are equally applicable to the environment of FIG. 5.

The environment of FIG. 5 includes a variety of payment entities, such as a payment terminal 104, a payment application 212, a central payment system 106, a payment network 108, and a bank 110. Other embodiments of the environment of FIG. 5 can include fewer, additional, or different entities than those shown in FIG. 2. Each payment entity is communicatively coupled to a central security system 116, and is configured to receive token tables and/or tokenization parameters from the central security system, as will be described herein in greater detail.

The payment terminal 104 receives payment information from a user 200 during the performance of a transaction, for instance at a card reader or other input interface associated with the payment terminal. The payment terminal includes the payment application 212, for instance running on the payment terminal or running in a computing system communicatively coupled to the payment terminal. The payment application receives the payment information from the payment terminal and sends the payment information to the central payment system 106 (as described above). For example, the payment application may store the payment information when the payment terminal is offline, and may send the payment information to the central payment system when the payment terminal is online, for instance in response to a request from the central payment system or after payment information representing a threshold number of transactions is stored by the payment application.

The central payment system 106 can store received payment information for subsequent routing to the payment network 108, or can immediately send received payment information to the payment network. Likewise, the payment network can store received payment information for subsequent routing to the bank 110, or can immediately send received payment information to the bank. The bank can process the transaction associated with the payment information by, for example, appropriating or transferring funds based on the received payment information. It should be noted that the payment network to which the central payment system sends the payment information can be based on information associated with or characteristics of the transaction ("transaction information" as used above). Similarly, the bank to which the payment network sends the payment information can be based on transaction information associated with the transaction.

In an example embodiment, a user with a Visa debit card associated with a Wells Fargo bank account can swipe the debit card at the grocery store checkout line card reader, and a payment application running on the card reader can send the debit card information to the grocery store's central payment system. The central payment system of the grocery store can be configured to, at a pre-determined time of day, send the debit card information to a payment network associated with Visa, which in turn is configured to send the debit card information to a bank server associated with Wells Fargo.

Any of the payment entities of the embodiment of FIG. 5 can tokenize payment information received from another payment entity. Further, any of the payment entities can implement one or more additional security measures, such as data modification (for instance, using IVs), encryption before or after tokenization, and the like. Accordingly, each payment entity in the embodiment of FIG. 5 can be configured to receive a set of token tables and/or a set of tokenization parameters from the central security system, and can tokenize received payment information based on the set of token tables and received tokenization parameters.

In some embodiments, a payment entity can receive payment information tokenized with a first set of token tables and according to a first set of tokenization parameters, and can tokenize the tokenized payment information using a second set of token tables and according to a second set of tokenization parameters. Payment entities can also detokenize payment information tokenized with a first set of token tables and according to a first set of tokenization parameters, and can re-tokenize the detokenized payment information using a second set of token tables and according to a second set of tokenization parameters. Although the term "tokenization parameters" is used herein, in some embodiments, a payment entity can receive an encryption algorithm and/or encryption key, and can encrypt/decrypt received payment information without explicitly performing tokenization.

The central security system 116 includes a central token server 500, a token generation module 502, a security interface 504, a token tables storage module 506, and a tokenization parameters storage module 508. In other embodiments, the central security system includes components other than those described herein.

The central token server 500 retrieves, in response to a request from the security interface 504, one or more token tables received stored in the token tables storage module 506, and serves the retrieved token tables to the payment entities of FIG. 5. The central token server can also receive token tables from the payment entities of FIG. 5, and can store the received token tables in the token tables storage module 506. For example, in an embodiment in which the payment application 212 generates token tables for use in tokenizing payment information, the payment application can output the generated token tables, and the central token server can receive and store the generated token tables for subsequent retrieval and serving to a payment entity for use in detokenizing payment information tokenized with the generated token tables (such as the payment network 108 or the bank 110).

The token generation module 502 generates token tables, for instance in response to a request from the security interface 504. Token tables generated by the token generation module are sent to one or more payment entities and/or stored in the token tables storage module 506 by the central token server 500. In one embodiment, the security interface provides a token table seed value to the token generation module, and the token generation module generates token tables based on the token table seed value.

The security interface 504 provides sets of token tables (via the central token server 500) and/or sets of tokenization parameters to the payment entities of the FIG. 5 for use in tokenizing payment information. As described above, each set of tokenization parameters can include an identity of one or more token tables for use in tokenization, a number of tokenization iterations to perform, a type of tokenization to perform, a data modification to perform (for instance, an IV modification), an encryption to perform, and any other property of tokenization. The security interface can provide a set of tokenization parameters stored in the tokenization parameters storage module 508, or can generate a set of tokenization parameters and provide the generated set of tokenization parameters.

The security interface 504 can select a set of token tables and a set of tokenization parameters to provide to a payment entity based on a variety of factors. For example, the security interface can select a set of token tables and/or a set of tokenization parameters based on properties associated with the payment entity (such as the identity of the payment entity, a company or person associated with the payment entity, or a security level requested by the payment entity), properties associated with the user 200 (such as the identity of the user, a user name associated with the user, and the like), or transaction information (such as an amount of the transaction, a payment method, and the like). The security interface can select a different set of token tables and a different set of tokenization parameters for each payment entity in FIG. 5, or can select the same set of token tables and/or tokenization parameters for one or more payment entities.

Any payment entity of FIG. 5 can tokenize received payment information and/or can detokenize payment information tokenized by a preceding payment entity. In addition, any payment entity can encrypt received payment information, can decrypt payment information encrypted by a preceding payment entity, can modify received payment information, and/or can de-modify payment information modified by a preceding payment entity. Further, any payment entity can tokenize previously tokenized payment information, resulting in payment information that is tokenized two, three, or more times. Similarly, any payment entity can encrypt previously encrypted information, and can modify previously modified information.

As used herein, a "preceding payment entity", relative to a second payment entity, refers to a payment entity within FIG. 5 that receives payment information in the performance of a transaction before the second payment entity. For example, the payment application 212 is a preceding payment entity relative to the central payment system 106, the payment network 108, and the bank 110. Further, it should be noted that in the context of FIG. 5, "payment information" may refer to tokenized or untokenized payment information.

It should be noted that the security interface 504 can provide sets of token tables and tokenization parameters to the payment entities of FIG. 5 in response to a transaction request by the user, in response to the receipt of payment application at the payment terminal 104, or in response to requests from the payment entities of FIG. 5. In addition, the central security system can provide sets of token tables and/or tokenization parameters to the payment entities of FIG. 5 in advance of a particular transaction, for instance periodically or after a set number of transactions.

In a first example embodiment, the payment terminal 104 receives payment information in association with a transaction, and forwards the payment information to the payment application 212. The payment application receives a first set of tokenization parameters identifying a first token table stored at the payment application, and identifying a first portion of the payment information to tokenize. In response, the payment application tokenizes the first portion of the payment information using the first token table to produce first tokenized payment information, and sends the first tokenized payment information to the central payment system 106. The central payment system receives a second set of tokenization parameters identifying a second token table stored at the central payment system and a second portion of the first tokenized payment information to tokenize. In response, the central payment system tokenizes the second portion of the tokenized payment information using the second token table to produce second tokenized payment information, and sends the second tokenized payment information to the payment network 108. The payment network sends the second tokenized payment information to the bank 110, which receives a third set of tokenization parameters identifying the token tables and payment information portions identified by the first and second sets of tokenization parameters. The bank retrieves the first and second token tables (for instance, from a token table storage module at the bank, or by requesting the token tables from the payment application and central payment system or from the central security system), and detokenizes the second tokenized payment information using the first and second token tables and based on the identified first and second payment information portions to obtain the original payment information for processing.

In a second example embodiment, the payment terminal 104 receives payment information from the user 200, and tokenizes the payment information using a first set of token tables stored at the payment terminal to produce first tokenized payment information. The payment application 212 receives an encryption algorithm from the central security system 116, encrypts the first tokenized payment information, and outputs the encrypted payment information. The central payment system 106 receives the encryption algorithm and a second set of token tables from the central security system, decrypts the encrypted payment information using the encryption algorithm, tokenizes the decrypted payment information using the second set of token tables, and outputs the second tokenized payment information. The payment network 108 receives the second set of token tables from the central security system, detokenizes the second tokenized payment information, and outputs the detokenized payment information. The bank 110 receives the first set of token tables from the central security system, and detokenizes the detokenized payment information with the first set of token tables to produce the original payment information.

Figure 6:
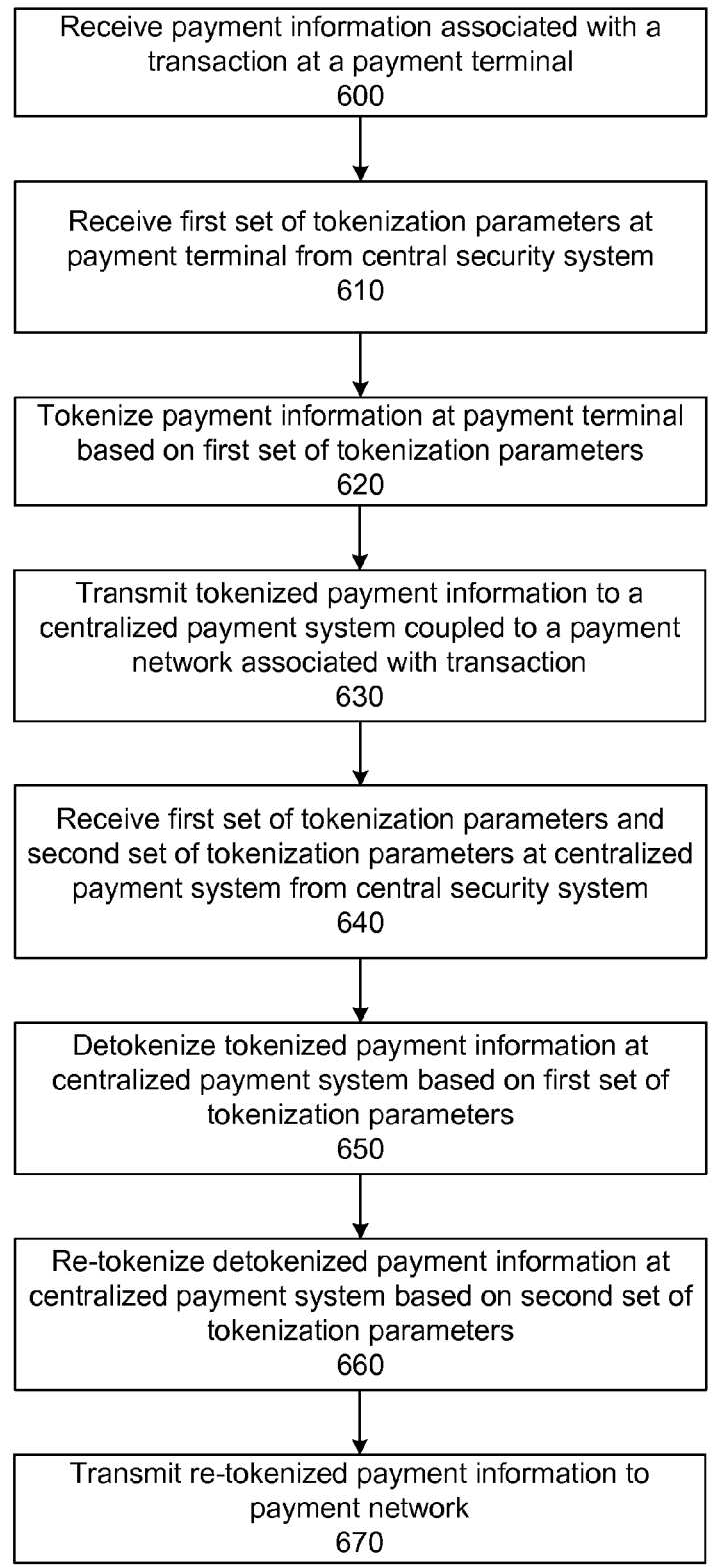
FIG. 6 is a flowchart of a process for the tokenization and transmission of data by payment entities coupled to a central security system, according to one embodiment.

FIG. 6 is a flowchart of a process for the tokenization and transmission of data by payment entities coupled to a central security system, according to one embodiment. A payment terminal receives 600 payment information associated with a transaction. The payment terminal also receives 610 a first set of tokenization parameters from a central security system. The payment terminal tokenizes 620 the payment information based on the first set of tokenization parameters, and transmits 630 the tokenized payment information to a centralized payment system coupled to a payment network associated with the transaction.

The centralized payment system receives 640 the first set of tokenization parameters and a second set of tokenization parameters from the central security system. The centralized payment system detokenizes 650 the tokenized payment information based on the first set of tokenization parameters, and re-tokenizes 660 the detokenized payment information based on the second set of tokenization parameters. The centralized payment system transmits 670 the re-tokenized payment information to the payment network.

Tokenization of Payment Information in Mobile Environments

FIG. 7 illustrates data flow in a mobile and payment tokenization environment, according to one embodiment. The environment of FIG. 7 includes a mobile device 102, a central payment system 106, a payment network 108, an authorization entity 112, and a central security system 116. Other embodiments of the environment of FIG. 7 can include fewer, additional, or different entities than those shown in FIG. 2.

A user 200 can register one or more credit card numbers, bank account numbers, or other payment information with the central security system 116, which provides tokenized representations of the payment information (hereinafter, "token cards") to the user's mobile device 102 for use in subsequent transactions. The central security system includes a central token server 500, a token tables storage module 506, a tokenization module 702, and a use rules storage module 704. The central security system as described in the embodiment of FIG. 7 can be a credit card company or bank interface (such as a website or computing system interface), a third-party tokenization broker (an entity configured to receive payment information from users and provide token cards based on the payment information) not affiliated with a credit card company or bank, or any other entity configured to provide a user with an interface to create token cards.

The central token server 500 retrieves token tables stored in the token tables storage module 506 in response to a request from the tokenization module 702 or the central payment system 106. The token tables storage module 506 stores a plurality of token tables, and each token table can be associated with one or more use rules. For instance, each token table can include a metadata field storing a description of one or more use rules, or a use rules table can map token table identifiers to use rules associated with each token table.

The use rules storage module 704 stores a plurality of use rules. As used herein, a "use rule" defines a limitation or restriction of the use of payment information based on transaction information. For instance, use rules can limit the use of payment information by business identity (a particular store, restaurant, and the like), by business type (e.g., movie theater, grocery store, hair salon), by geographic location (e.g., a particular city, state, or country), by transaction amount (the cost of a purchase or the amount of a transfer of funds), by date (e.g., day of the week, week, month, or particular date), by time (e.g., before 7 pm, or between 11 am and 1 pm), by item/service purchase (e.g., groceries, gasoline), by merchant type (e.g., online or in-store), or by any other transaction characteristic. The use rules storage module can also store a use rules table mapping token table identifiers to use rules. For example, for a token table that is used to tokenize payment information to produce token cards for use in transactions under $100, a token table identifier for the token table can be mapped to the use rule "under $100" in the use rules table.

The user 200 can request a token card through an interface provided by the tokenization module 702. The tokenization module can prompt the user to enter payment information and to select one or more use rules. In one embodiment, the tokenization module retrieves example use rules from the use rules storage module 704 for display to a user, and the user can select from among the displayed use rules. Alternatively, the user can create customized use rules that are subsequently stored in the use rules storage module. The tokenization module receives payment information and a selection of one or more use rules 700. For example, the tokenization module may receive a credit card number and a selection of use rules restricting the use of a token card associated with the credit card number to gas stations and for purchases under $50.

The tokenization module 702 identifies (via the central token server 500) a token table stored at the token tables storage module 506 associated with the selected use rules. In one embodiment, the central token server queries metadata fields associated with each token table stored in the token tables storage module to identify a token table associated with the selected use rules. Alternatively, the central token server can query a use rules table to identify a token table associated with the selected use rules. An identified token table associated with the selected use rules is retrieved by the central token server and provided to the tokenization module. It should be noted that while the remainder of the description herein is limited to the identification of one table based on selected use rules for use in tokenizing payment information, other embodiments may identify multiple token tables associated with selected use rules for use in tokenizing payment information according to the principles described herein.

The tokenization module tokenizes the received payment information using the identified token table to produce a token card 706, and provides the token card to a mobile device 102 of the user. The tokenization module can tokenize the received payment information by querying the identified token table with a data string representing the payment information, and by outputting the token mapped to the data string in the identified token table as the token card. In other embodiments not described further herein, the tokenization module can produce a token card by querying the identified token table with a portion of the data string representing the payment information, by replacing the portion of the data string with the token mapped to the data string portion in the identified token table, and by outputting the partial tokenized payment information as the token card. Similarly, any tokenization parameters can be used by the tokenization module to tokenize the received payment information, though further description of such embodiments is not included for the purposes of simplicity.

It should be noted that a user can create multiple token cards using the same payment information (e.g., the same credit card number) by selecting different use rules in each instance of creating a token card for the payment information. For example, a first token card limiting transactions to grocery store purchases can be generated for a credit card number limiting purchases to grocery stores, a second token card limiting transactions to restaurant purchases under $75 can be generated for the credit card number, and so forth.

As will be described below in greater detail, the selected use rules used to detokenize a token card are identified by first identifying the token table used to generate the token card, and then identifying the use rules associated with the token table (for instance by querying the metadata field of the token table or querying a use rules table as described above). Accordingly, in order to identify the token table used to generate the token card, the token tables stored at the token tables storage module 506 are queried to identify the token table that includes the token used to generate the token card. Thus, in some embodiments, no two token tables stored at the token tables storage module include the same token, allowing each token table to be uniquely identified by any of the tokens included in the token table.

In one embodiment, the tokenization module allows the user to provide a name for a token card for display on the mobile device. For example, for a use rule restricting the use of a bank account number to purchases in Toronto, Canada, a user can provide the token card name "Toronto vacation", the tokenization module can store the token card name within the token card (for instance, in a metadata field), and the mobile device can display the token card name "Toronto vacation" in a list of token card names associated with token cards at the mobile device.

Accordingly, the user 200 can register a plurality of credit cards, debit cards, bank accounts, and other payment information with the central security system 116 in advance of conducting transactions associated with the registered payment information. The central security system generates a token card each time the user provides payment information based on the use rules selected by the user, and the token cards are sent to the user's mobile device 102 for storage. Beneficially, the payment information itself is not stored at the mobile device, limiting the exposure and risk of conducting transactions with the mobile device. In addition, by generating token cards based on use rules, the user further limits the risk of an unauthorized entity conducting transactions with the mobile device in the event the mobile device is lost by the user. An unauthorized entity that gains access to the mobile device will be restricting in the use of the payment information based on the use rules selected by the user.

The user 200 uses the mobile device 102 to conduct a transaction using a token card stored at the mobile device. The mobile device includes a user interface 710, a token cards storage module 712, a payment application 214, and an authorization interface 728. In other embodiments, the mobile device includes different components than those shown in the embodiment of FIG. 7.

The payment application 214 of the mobile device 102 is an application configured to allow the user 200 to conduct a transaction with a token card stored in the token cards storage module 712. The token cards storage module stores token cards received from the central security system. The payment application presents one or more stored token cards to the user via the user interface 710. The user interface includes a display configured to display token cards presented by the payment application and input means configured to allow the user to select a presented token card.

Upon receiving a request for a transaction from the user 200, the payment application 214 displays one or more stored token cards (for instance, all token cards stored at the token cards storage module, or a subset of stored token cards selected based on transaction information associated with the transaction) via the user interface 710. In response, the user can provide a token card selection 708 to the payment application via the user interface. The payment application retrieves the selected token card from the token cards storage module 712 and outputs the selected token card and associated transaction information 714 to the central payment system 106. As noted above, the transaction information includes various characteristics of the transaction, for instance, the cost of the transaction, the merchant associated with the transaction, the geographic location of the transaction, and the like.

The central payment system 106 includes a payment interface 218, a token tables storage module 204D, a verification module 718, and a detokenization module 720. In other embodiments, the central payment system includes different components than those shown in the embodiment of FIG. 7. The payment interface, as described above, is configured to receive tokenized payment information (e.g., a selected token card), and to route payment information 720 to the payment network 108. The token tables storage module 204D stores token tables 716 received from the central security system 116. The central security system can provide token tables stored at the token tables storage module 506 to the token tables storage module 204D in advance of a particular transaction, in response to a request to create a token card from the user 200, or in response to a request from the central payment system. The central security system can provide all token tables to the central payment system, or can provide just the token tables used in the creation of token cards. The central security can also provide a use rules table to the central payment system for use in identifying token tables used in the generation of token cards.

The verification module 718 is configured to receive the selected token card and transaction information 714 from the payment interface 218. In response to receiving the selected token card, the verification module identifies the token table used to generate the selected token card. The verification module queries the token tables stored in the token tables storage module 204D to identify the token table including the selected token card as a token. In alternative embodiments, the verification module queries the central security system 116 to identify a token table stored in the token tables storage module 506 that includes the token equivalent to the selected token card. In embodiments in which the tokenization module 702 tokenizes payment information based on a set of tokenization parameters including tokenization operations other than the replacement of payment information with a token, the verification module retrieves the set of tokenization parameters and identifies the token table used to generate the selected token card based on the set of tokenization parameters.

Upon identifying the token table used to generate the selected token card, the verification module 718 identifies the use rules associated with the token table. In embodiments in which the use rules are stored in a metadata field of each token table, the verification module accesses the metadata field of the identified token table to identify the stored use rules. In embodiments in which the use rules are stored in a use rules table mapping token table identifiers to use rules associated with token tables, the verification module queries the use rules table with an identifier of the identified token table to identify use rules associated with the identified token table.

In response to identifying use rules associated with the identified token table used to generate the selected token card, the verification module 718 determines whether the identified use rules are satisfied based on the received transaction information and approves or denies the transaction based on the determination. For example, if the transaction information identifies that the transaction request is originating from Oregon, and the identified use rules limit use of the selected token card to transactions originating from California, the verification module determines that the use rules are not satisfied by the received transaction information and denies the transaction. In another example, if the transaction information identifies that the transaction is for $16, and the identified use rules limit use of the selected token card to transactions under $20, the verification module determines that the use rules are satisfied by the received transaction information and allows the transaction. In one embodiment, the verification module only verifies the transaction if all identified use rules are satisfied by the received transaction information.

In response to the approval of the transaction by the verification module 718, the detokenization module 720 detokenizes the selected token card using the identified token table to produce the payment information associated with the selected token card. The payment interface 218 transmits the payment information 722 to the payment network 108. In some embodiments, prior to processing the transaction, the payment network can seek authorization for the transaction from an authorization entity 112. Accordingly, the payment network can send an authorization request 724 including, for example, the amount of the transaction, the identity of the merchant, and any other suitable transaction information to the authorization entity.

The authorization entity 112, in response to receiving the authorization request 724, can authorize the transaction based on the transaction information included in the authorization request. For instance, if the transaction is for an amount below a threshold or within a geographic region associated with the user 200, the authorization entity can authorize the transaction without further input from the user. The authorization entity can also require user authorization from the user based on the transaction information included in the authorization request prior to authorizing the transaction. Continuing with the previous example, if the transaction is for an amount above the threshold or outside the geographic region associated with the user, the authorization entity can prompt the user to provide user authorization before the authorization entity authorizes the transaction.

Upon determining that user authorization is required to authorize a transaction, the authorization entity 112 can send a user authorization request 726 to the mobile device 102 of the user 200. The authorization interface 728 of the mobile device can receive the user authorization request and can prompt the user via the user interface 710 to authorize the transaction. For example, the authorization interface can display text via the user interface indicating that user authorization is required, and can receive via the user interface user input authorization the transaction. The authorization entity can specify via the user authorization request a type of authorization required. For instance, the authorization entity can require the user to enter a PIN, password, or other user credentials associated with the user and known to the authorization entity in order to authorize the transaction, or can merely require the user to select an "authorize" button in order to authorize the transaction. The authorization interface can display a request for user credentials via the user interface and based on the authorization requirements of the authorization entity.

The user 200 can authorize the transaction via the mobile device 102, for instance by entering required user credentials, by selecting an "authorize" button, or by providing any other authorization information. Upon receiving authorization information from the user, the authorization interface 728 sends a user authorization 730 to the authorization entity 112. The user authorization can include authorization information such as a PIN, password, or other user credentials. In addition, the user can reject the transaction, for instance, by selecting a "do not authorize" button provided by the authorization interface, or by taking no action with regards to the displayed authorization request. In response, the authorization interface can send the authorization rejection to the authorization entity, and in response, the authorization entity can deny authorization to the payment network.

If the authorization entity 112 does not require that the user 200 provide various user credentials when authorizing the transaction, the authorization entity can authorize the transaction upon receiving the user authorization 730. If the authorization entity requires that the user provide various user credentials (such as a PIN or password), the authorization entity can determine whether the user credentials match known user credentials associated with the user, and can authorize the transaction based on the determination. If the authorization entity authorizes the transaction, the authorization entity outputs the authorization 732 to the payment network 108, and the payment network processes the transaction.

In one embodiment, the use rules selected by a user 200 in the creation of a token card 706 can specify a level of authorization required for a transaction. For example, a user rule can specify that a PIN number or password be entered by the user at the mobile device before the transaction can be authorized. Accordingly, the central payment system 106, upon receiving a selected token card generated based on such a use rule, can indicate to the payment network 108 that a particular authorization is required. The payment network in turn can send an authorization request 724 to the authorization entity 112 specifying the required authorization, and the authorization entity 112 can send a user authorization request 726 based on the required authorization.

In an alternative embodiment, the central security system 116 can generate token cards 706 based on selected use rules, and can generate a token card table associating each token card with the use rules selected in the generation of the each token card. The central security system can then send the token card table to the central payment system 106, and the verification module 718 can identify the user rules associated with a selected token card by querying the token card table with the selected token card. In such an embodiment, token tables used in the generation of token cards are not necessarily associated with use rules. In addition, the token card table can associate each token card with the identities of the one or more token tables used to generate the token card, allowing the verification module to identify the token tables used to generate a selected token card by querying the token card table with the selected token card. In such an embodiment, if the verification module identifies a token table used to generate a selected token card that is not stored at the token tables storage module 204D, the verification module can request and receive the identified token table from the central security system 116.

Figure 8:
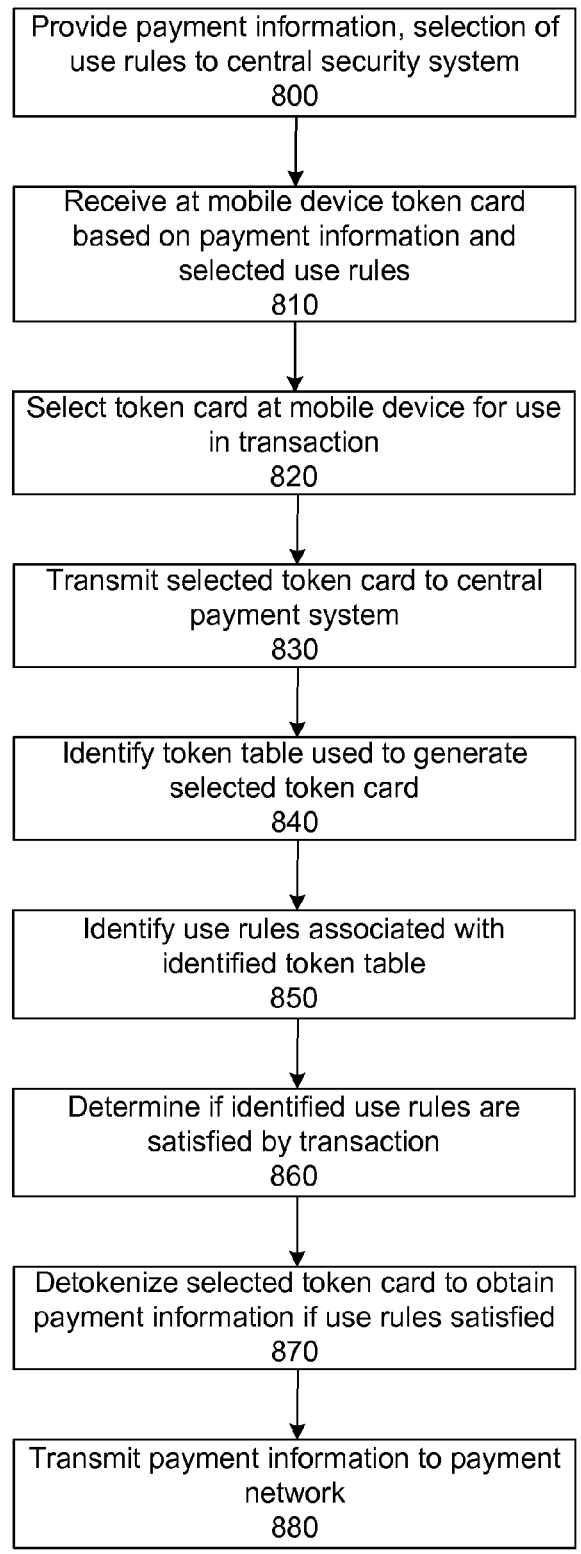
FIG. 8 is a flowchart of a process for using tokenized payment information stored on a mobile device in a financial transaction, according to one embodiment.

FIG. 8 is a flowchart of a process for using tokenized payment information stored on a mobile device in a financial transaction, according to one embodiment. A user provides 800 payment information and a selection of use rules to a central security system. The payment information can be, for example, a credit card number, and the selected use rules can restrict, for example, the use of payment information to transactions under a threshold amount and within a geographic region. The central security system can identify a token table associated with the selected use rules, and tokenize the payment information using the identified token table to generate a token card.

A mobile device of the user receives 810 a token card based on the provided payment information and the selected use rules. A user selects 820 the token card, for instance from among a plurality of token cards stored at the mobile device, for use in a transaction. The mobile device transmits 830 the selected token card to a central payment system for verification. The mobile device can also transmit various transaction information associated with the transaction.

The central payment system identifies 840 the token table used to generate the selected token card, for instance by querying token tables stored at the central payment system or by querying the central security system with the selected token card. The central payment system then identifies 850 the use rules associated with the identified token table, for instance by querying a metadata field of the identified token table storing the use rules or by querying a use rules table mapping token table identities to use rules.

The central payment system determines 860 if the identified use rules are satisfied by the transaction. For example, the central payment system ensures that the transaction information associated with the transaction do not violate the restrictions of the use rules. Responsive to a determination that the use rules are satisfied, the central payment system detokenizes 870 the selected token card using the identified token table to obtain the original payment information, and transmits 880 the payment information to a payment network. In some embodiments, the payment network requires authorization from an authorization entity and/or the user, and the user is prompted via the mobile device to provide authorization for the transaction (for instance by entering a PIN or password into the mobile device).

Additional Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A mobile device configured for operation in a mobile environment comprising a central server configured to communicatively couple to and communicate with a plurality of mobile devices, comprising:

a hardware display configured to:
  display an interface configured to enable an interaction with the mobile device by a user, the interaction generating sensitive data representative of the interaction; and
  display, by the hardware display, information corresponding to the interaction;
a memory configured to store the sensitive data, one or more attributes of the interaction, and a set of token tables each mapping each of a plurality of input values to a different token value;
a token server coupled to the memory and configured to:
  access, from the memory, a token table from the set of token tables in response to a request for the token table from a security engine of the mobile device; and
  provide the accessed token table to the security engine; and
the security engine comprising at least one hardware processor coupled to the memory and configured to:
  access the sensitive data in the memory;
  request a token table from the token server via an internal communications bus coupling the token server to the security engine, the requested token table selected from the set of token tables based on one or more attributes of the interaction;
  receive the selected token table from the token server via the internal communications bus;
  modify the sensitive data using the selected token table by querying the selected token table with a value of a portion of the sensitive data to identify a token value mapped to the value of the portion of the sensitive data by the selected token table and replacing the portion of the sensitive data with the identified token value; and
  responsive to a determination that the mobile device is communicatively coupled to the central server, providing the modified sensitive data to the central server via a communications network using the a communications interface of the mobile device.

2. The mobile device of claim 1, wherein the token server is configured to receive the set of token tables from the central server via the communications network using the communications interface.

3. The mobile device of claim 1, wherein the token server is configured to generate a token table seed value based on one or more attributes of the interaction, and to generate the selected token table using the token table seed value.

4. The mobile device of claim 1, wherein the one or more attributes of the interaction upon which the token table is selected comprises an identity of the user.

5. The mobile device of claim 1, wherein the one or more attributes of the interaction upon which the token table is selected comprises an identity of a second user associated with the interaction.

6. The mobile device of claim 1, wherein the one or more attributes of the interaction upon which the token table is selected comprises a time and date associated with the interaction.

7. The mobile device of claim 1, wherein the one or more attributes of the interaction upon which the token table is selected comprises a type of the interaction.

8. The mobile device of claim 1, wherein the central server is configured to receive via the communications network, and store in a storage device coupled to the central server, modified sensitive data received from each of the plurality of mobile devices.

9. The mobile device of claim 1, wherein the security engine is further configured to:
  responsive to a determination by the communications interface that the mobile device is not communicatively coupled to the central server, store the modified sensitive data in the memory until the mobile device subsequently communicatively couples to the central server.

10. The mobile device of claim 1, wherein the modified data is provided via the communications network to the central server further in response to a request from the central server.

11. The mobile device of claim 1, wherein the communications network comprises a wireless communications network, and wherein the communications interface comprises a wireless communications interface.

12. A method for improving the performance of a mobile device in a mobile environment comprising a central server configured to communicatively couple to and communicate with a plurality of mobile devices, comprising:
  accessing, by the mobile device, sensitive data representative of an interaction between a user and the mobile device;
  storing, by a memory of the mobile device, the sensitive data, one or more attributes of the interaction, and a set of token tables each mapping each of a plurality of input values to a different token value;
  selecting, by a token server coupled to the memory of the mobile device, a token table from the set of token tables based on one or more attributes of the interaction;
  modifying, by a security engine coupled to the memory of the mobile device, the sensitive data using the selected token table by querying the selected token table with a value of a portion of the sensitive data to identify a token value mapped to the value of the portion of the sensitive data by the selected token table and replacing the portion of the sensitive data with the identified token value; and
  responsive to a determination that the mobile device is communicatively coupled to the central server, providing, by the mobile device, the modified sensitive data to the central server.

13. The method of claim 12, wherein the set of token tables is received from the central server.

14. The method of claim 12, further comprising:
  generating, by the mobile device, a token table seed value based on one or more attributes of the interaction; and
  generating the selected token table based on the token table seed value.

15. The method of claim 12, wherein the one or more attributes of the interaction upon which the token table is selected comprises an identity of the user.

16. The method of claim 12, wherein the one or more attributes of the interaction upon which the token table is selected comprises an identity of a second user associated with the interaction.

17. The method of claim 12, wherein the one or more attributes of the interaction upon which the token table is selected comprises a time and date associated with the interaction.

18. The method of claim 12, wherein the one or more attributes of the interaction upon which the token table is selected comprises a type of the interaction.

19. The method of claim 12, wherein the central server is configured to receive and store modified sensitive data received from each of the plurality of mobile devices.

20. The method of claim 12, further comprising:
responsive to a determination that the mobile device is not communicatively coupled to the central server, storing, by the mobile device, the modified sensitive data until the mobile device subsequently communicatively couples to the central server.

\* \* \* \* \*